US012673458B2

(12) United States Patent
Park et al.

(10) Patent No.: US 12,673,458 B2
(45) Date of Patent: Jul. 7, 2026

(54) POUCH SHAPING APPARATUS CAPABLE OF REMEDYING POUCH WRINKLES

(71) Applicant: LG Energy Solution, Ltd., Seoul (KR)

(72) Inventors: Sung Chul Park, Daejeon (KR); Shin Chul Kim, Daejeon (KR); Tae Won Kang, Daejeon (KR); Yong Nam Kim, Daejeon (KR); Byung Kwan Ko, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 333 days.

(21) Appl. No.: 18/027,550

(22) PCT Filed: May 26, 2022

(86) PCT No.: PCT/KR2022/007518
§ 371 (c)(1),
(2) Date: Mar. 21, 2023

(87) PCT Pub. No.: WO2022/250482
PCT Pub. Date: Dec. 1, 2022

(65) Prior Publication Data
US 2023/0373152 A1 Nov. 23, 2023

(30) Foreign Application Priority Data
May 27, 2021 (KR) ........................ 10-2021-0068631

(51) Int. Cl.
*B29C 51/08* (2006.01)
*B29C 51/14* (2006.01)
(Continued)

(52) U.S. Cl.
CPC ............ *B29C 51/082* (2013.01); *B29C 51/14* (2013.01); *B29C 51/262* (2013.01); *B29C 51/30* (2013.01);
(Continued)

(58) Field of Classification Search
CPC ..... B29C 51/082; B29C 51/14; B29C 51/262; B29C 51/30; H01M 50/105; H01M 10/0404
See application file for complete search history.

(56) References Cited

U.S. PATENT DOCUMENTS 2,666,951 A * 1/1954 Grove ................... B29C 51/262
425/DIG. 48
2012/0082827 A1 4/2012 Bae et al.
(Continued)

FOREIGN PATENT DOCUMENTS

CN 101259498 A 9/2008
CN 207448945 U * 6/2018 ............. B29C 45/01
(Continued)

OTHER PUBLICATIONS

International Search Report for Application No. PCT/KR2022/007518 mailed Aug. 29, 2022, pp. 1-4.
(Continued)

*Primary Examiner* — Galen H Hauth
*Assistant Examiner* — John Robitaille
(74) *Attorney, Agent, or Firm* — Lerner David LLP

(57) ABSTRACT

A pouch shaping apparatus includes a support unit configured to allow a laminate sheet to be disposed on an upper surface thereof, a stripper located above the support unit, the stripper configured to be movable upwards and downwards and to press and fix an outer periphery of the laminate sheet disposed on the upper surface of the support unit when being moved downwards, and a punch located above the support unit, the punch configured to be movable upwards and downwards and to form an electrode assembly receiving portion in the laminate sheet while being inserted into a shaping portion located at the center of the support unit when being moved downwards. The support unit includes an upper support and a support plate, and the pouch shaping (Continued)

400 411
430
420 apparatus includes a core member located between the upper support and the support plate, the core member having a predetermined thickness.

18 Claims, 7 Drawing Sheets

(51) Int. Cl.

| | |
|---|---|
| *B29C 51/26* | (2006.01) |
| *B29C 51/30* | (2006.01) |
| *H01M 10/04* | (2006.01) |
| *H01M 50/105* | (2021.01) |
| *B29L 31/00* | (2006.01) |

(52) U.S. Cl.

CPC ..... *H01M 10/0404* (2013.01); *H01M 50/105* (2021.01); *B29L 2031/7146* (2013.01)

(56) References Cited

U.S. PATENT DOCUMENTS

| | | | |
|---|---|---|---|
| 2016/0046086 A1* | 2/2016 | Wenzel | B29C 70/56 |
| | | | 425/298 |
| 2018/0205107 A1 | 7/2018 | Lee et al. | |
| 2019/0039112 A1 | 2/2019 | Hirata et al. | |
| 2020/0168853 A1 | 5/2020 | Kim et al. | |
| 2020/0282627 A1 | 9/2020 | Kim et al. | |

FOREIGN PATENT DOCUMENTS

| | | | | | |
|---|---|---|---|---|---|
| CN | 208662317 U | * | 3/2019 | ............ | B21D 37/10 |
| CN | 109911326 A | | 6/2019 | | |
| CN | 110382204 A | | 10/2019 | | |
| JP | 11309519 A | | 11/1999 | | |
| JP | 2007061895 A | | 3/2007 | | |
| KR | 20060011428 A | | 2/2006 | | |
| KR | 20080081845 A | | 9/2008 | | |
| KR | 101043090 B1 | | 6/2011 | | |
| KR | 20130131522 A | | 12/2013 | | |
| KR | 20140019933 A | | 2/2014 | | |
| KR | 101453559 B1 | | 10/2014 | | |
| KR | 101467859 B1 | | 12/2014 | | |
| KR | 20170104252 A | | 9/2017 | | |
| KR | 20180085471 A | | 7/2018 | | |
| KR | 20180116563 A | | 10/2018 | | |
| KR | 20180118929 A | | 11/2018 | | |
| KR | 102106872 B1 | | 5/2020 | | |
| KR | 20200052061 A | | 5/2020 | | |
| KR | 102145494 B1 | | 8/2020 | | |
| KR | 102176631 B1 | | 11/2020 | | |

OTHER PUBLICATIONS

EESR for Application No. 22811673.7 dated Feb. 20, 2024. 13 pgs.
Search Report dated May 23, 2025 from the Office Action for Chinese Application No. 202280006586.5 issued May 24, 2025, pp. 1-4.

* cited by examiner

【FIG. 1】
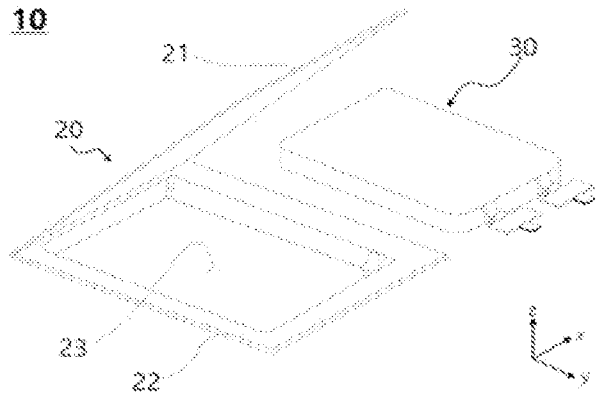
PRIOR ART
【FIG. 2】
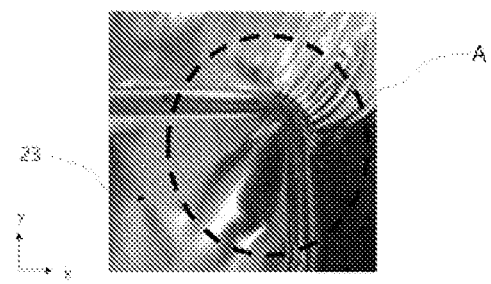
PRIOR ART
【FIG. 3】
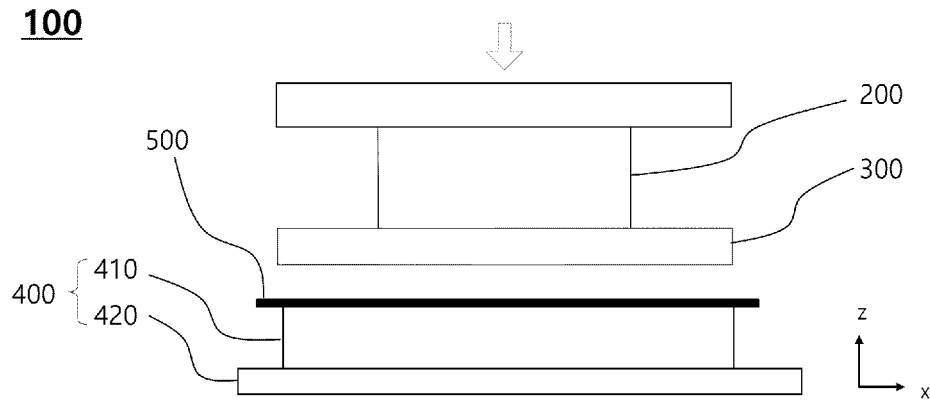

【FIG. 4】
400
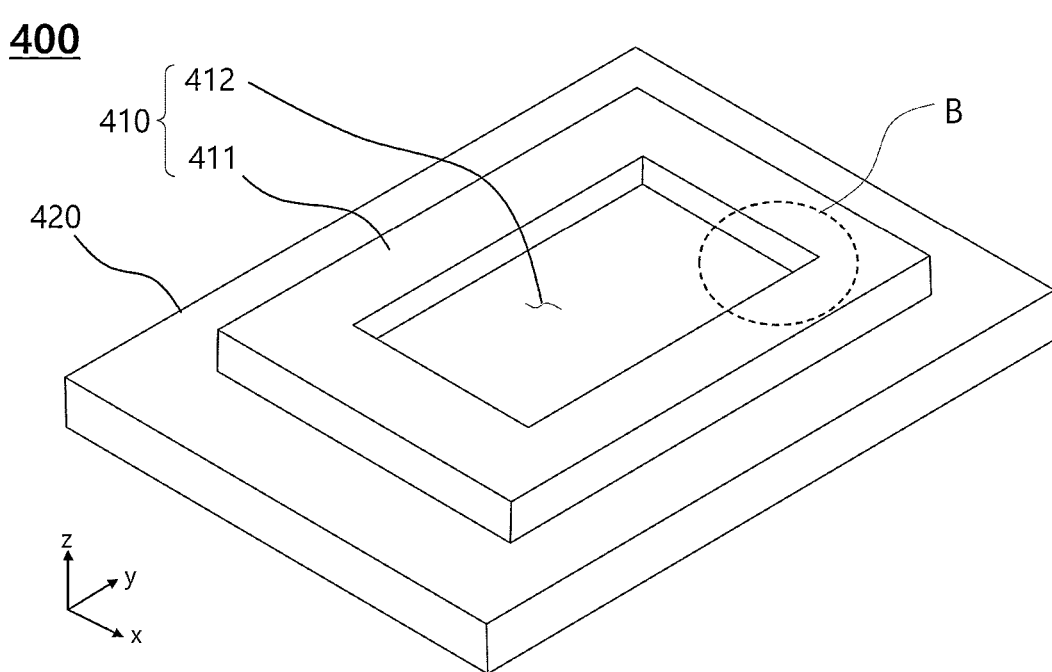
【FIG. 5】
400
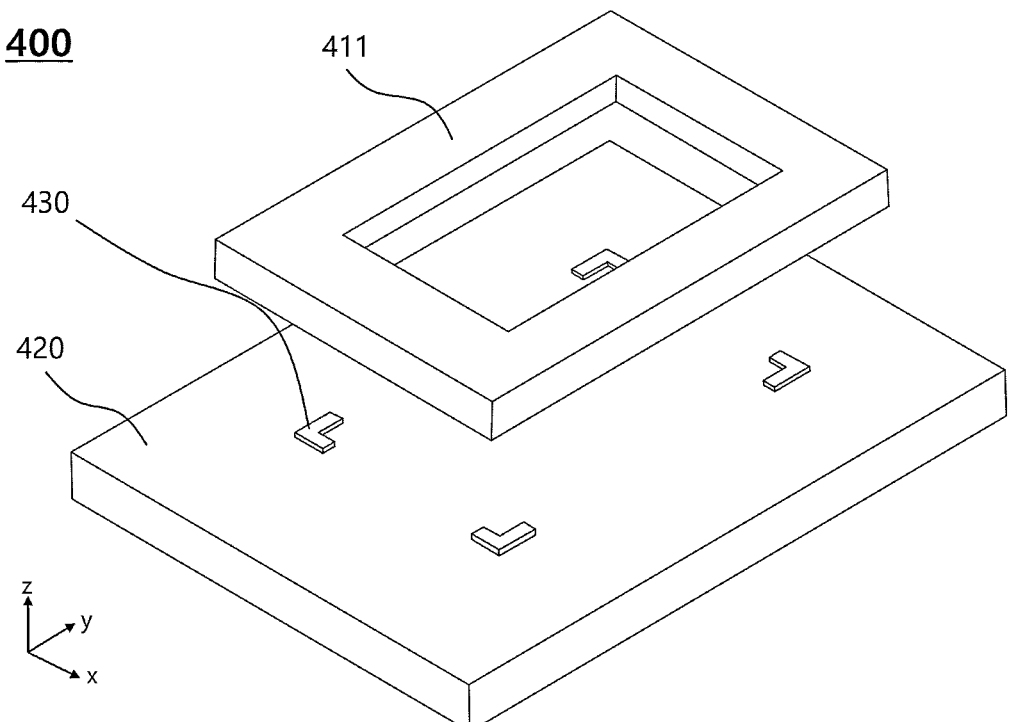

【FIG. 6】
1300
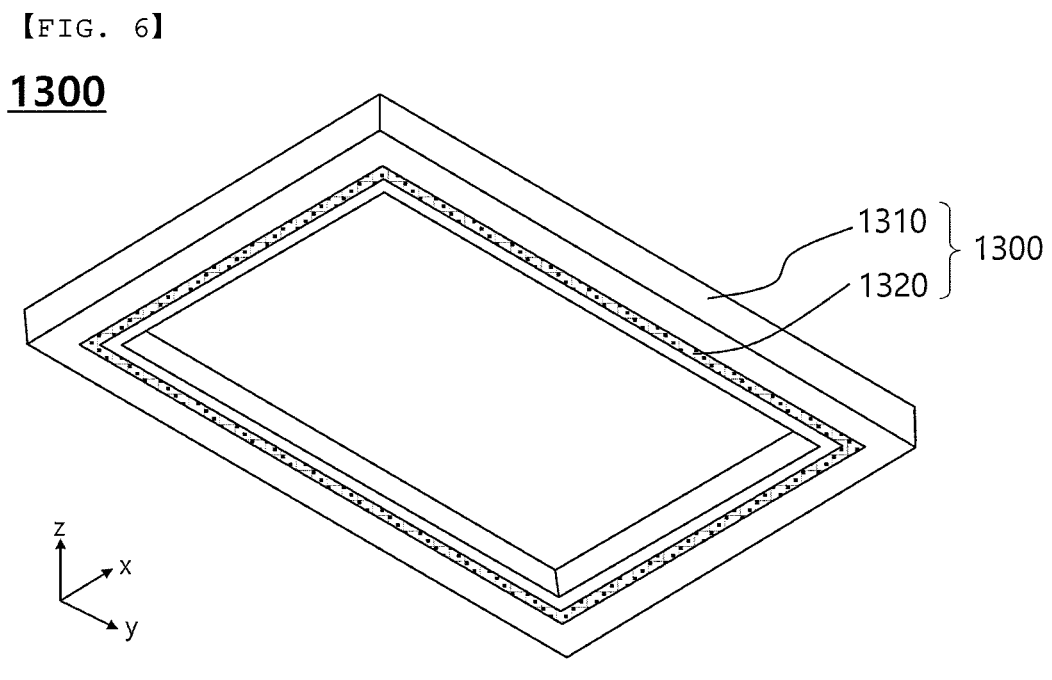
【FIG. 7】
2300
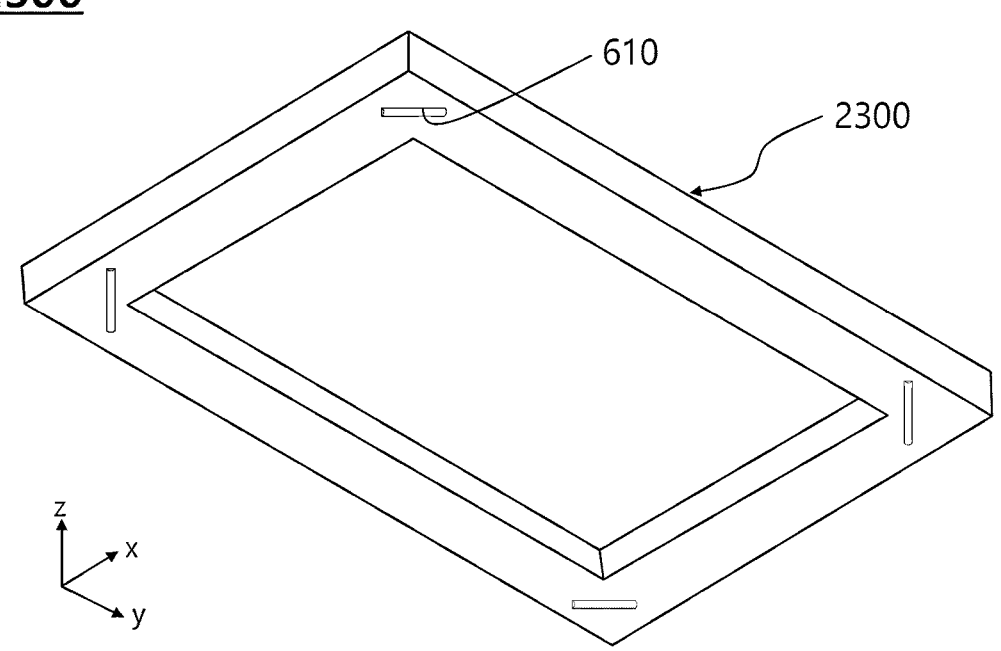

【FIG. 8】
2400
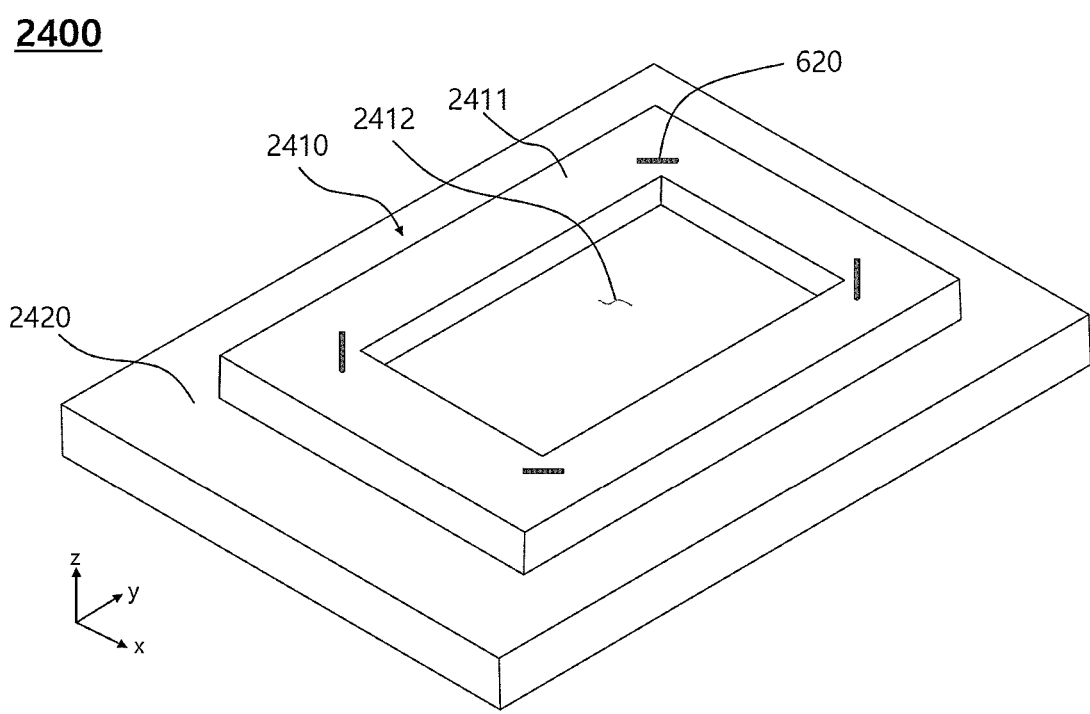

【FIG. 9A】
Max displacement
34 μm
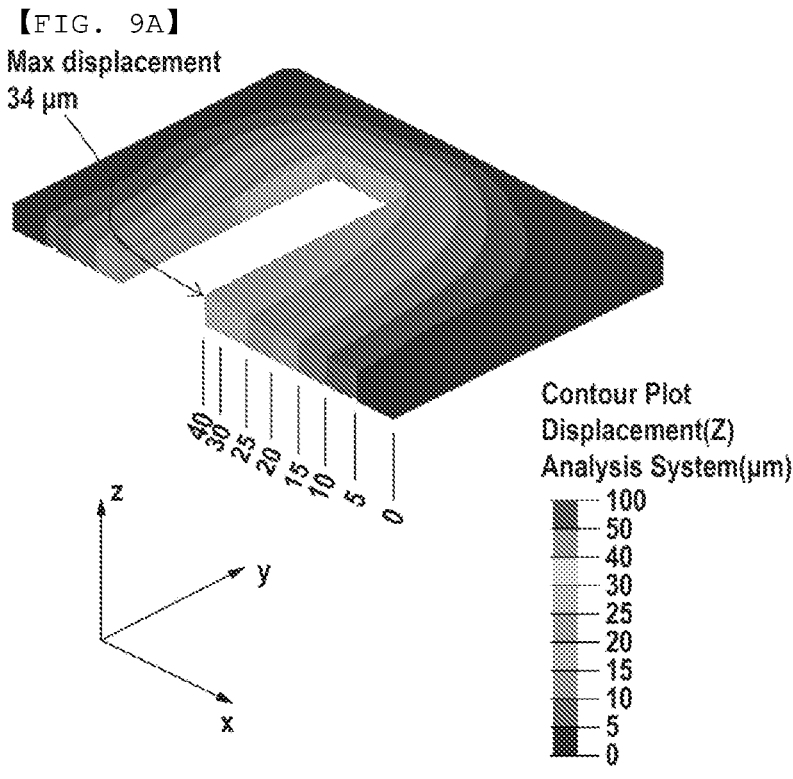
Contour Plot
Displacement(Z)
Analysis System(μm)
100
50
40
30
25
20
15
10
5
0
【FIG. 9B】
Max displacement
51 μm
Contour Plot
Displacement(Z)
Analysis System(μm)
100
50
40
30
25
20
15
10
5
0

【FIG. 10A】
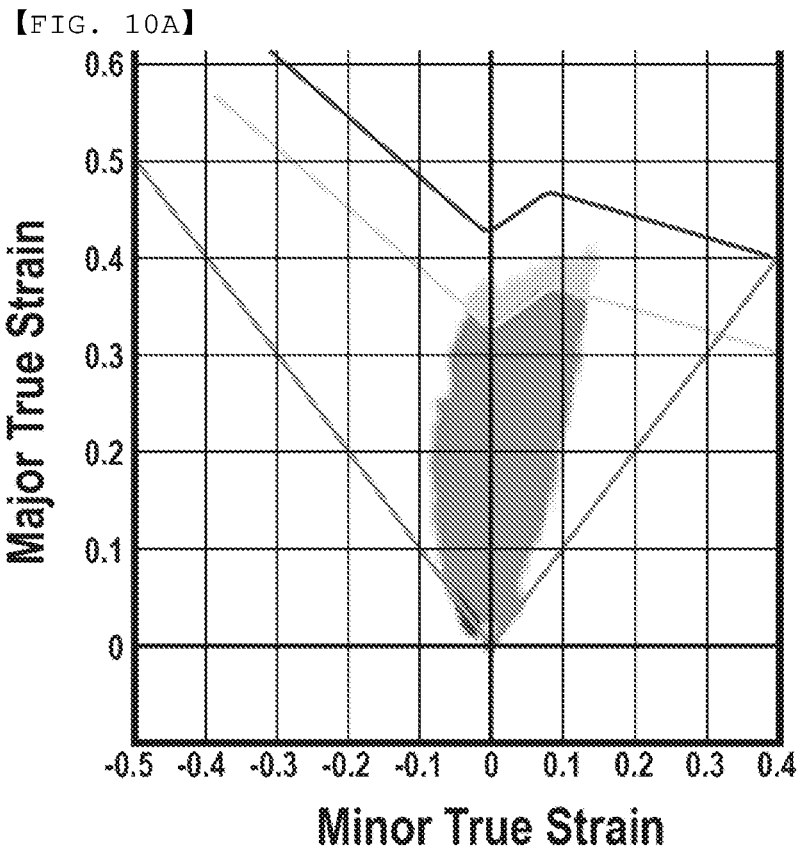
【FIG. 10B】
Maximum thickness increase rate
1.08%
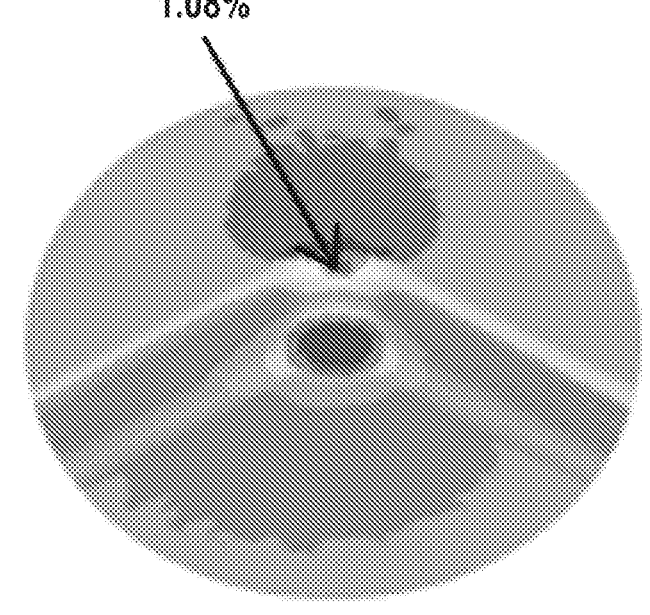

【FIG. 11A】
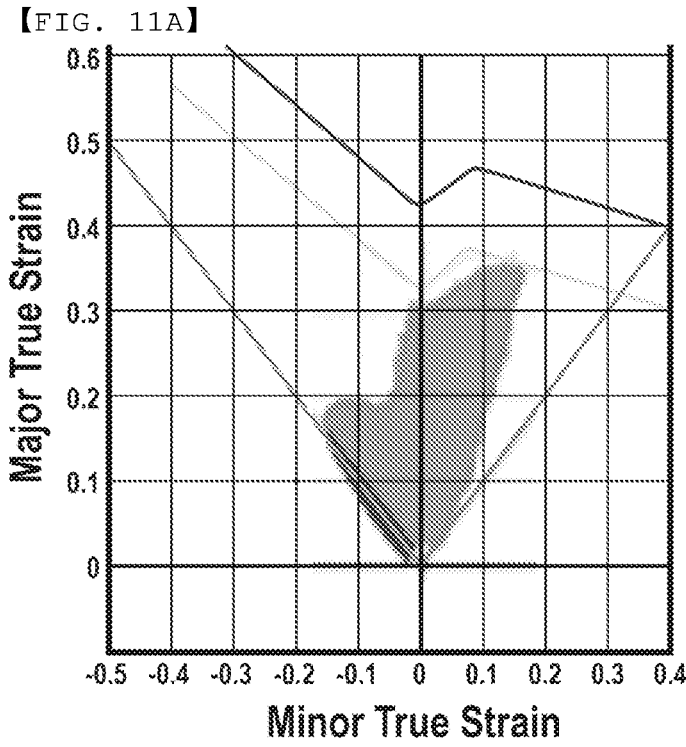
【FIG. 11B】
Maximum thickness increase rate
2.24%
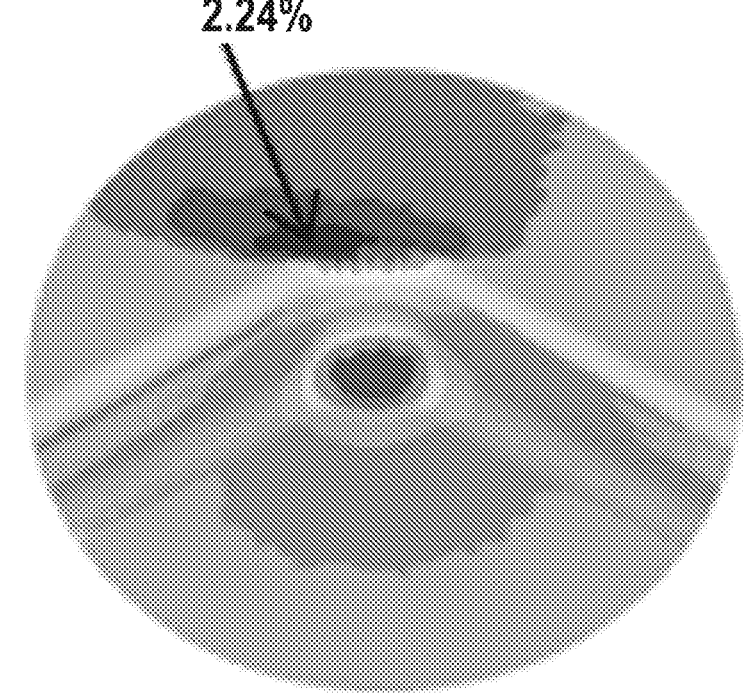

POUCH SHAPING APPARATUS CAPABLE OF REMEDYING POUCH WRINKLES

CROSS-REFERENCE TO RELATED APPLICATIONS

The present application is a national phase entry under 35 U.S.C. § 371 of the International Application No. PCT/KR2022/007518 filed on May 26, 2022, which claims priority from Korean Patent Application No. 10-2021-0068631 filed on May 27, 2021, the disclosures of which are incorporated herein by reference in their entireties.

FIELD OF THE INVENTION

The present invention relates to a pouch shaping apparatus capable of remedying pouch wrinkles. More particularly, the present invention relates to a pouch shaping apparatus having a core member located between an upper support and a support plate and a pouch manufactured with remedied wrinkles manufactured thereby.

BACKGROUND OF THE INVENTION

Secondary batteries may be classified into a cylindrical battery, a prismatic battery, and a pouch-shaped battery based on the shape thereof. Among these batteries, the pouch-shaped battery, which can be stacked with high integration, has high energy density per unit weight, and can be easily deformed, has attracted considerable attention.

The pouch-shaped battery, which means a battery configured such that a battery case is made of a laminate sheet, has a structure in which an electrode assembly is mounted in the battery case. FIG. 1 is a schematic view of a pouch-shaped battery 10, wherein the pouch-shaped battery 10 has an electrode assembly 30 mounted in a battery case 20, the electrode assembly including a positive electrode, a negative electrode, and a separator disposed therebetween. Positive electrode and negative electrode tabs of the electrode assembly 30 are welded to two electrode leads, respectively, and the battery case is hermetically sealed in the state in which the electrode leads are exposed outwards from the battery case.

The battery case 20 is made of a laminate sheet, and includes a concave receiving portion 23, in which the electrode assembly 30 is seated. An upper case 21 corresponds to a lower case 22, and hermetically seals the receiving portion 23, in which the electrode assembly 30 is received. The receiving portion 23 is manufactured by pressing and deforming the laminate sheet using a punch having a shape corresponding to the shape of the receiving portion.

FIG. 2 is a photograph showing wrinkles formed at a corner part of the receiving portion of the pouch-shaped battery. Referring to FIG. 2, when the receiving portion 23 is shaped by pressing of the punch, wrinkles may be generated at a corner part A of the electrode assembly receiving portion 23. The wrinkles cause a substantial problem in that the pouch-shaped battery is easily damaged during manufacture or use of the pouch-shaped battery as well as an aesthetical problem.

Patent Document 1 discloses a pouch shaping apparatus and a shaping method capable of gradually reducing pressing force of a stripper configured to fix a laminate sheet, whereby it is possible to gradually increase elongation of the laminate sheet, and therefore it is possible to prevent generation of cracks at an angular point of a receiving portion.

In Patent Document 1, the pouch shaping apparatus includes a punch, a stripper member including a stripper configured to press a laminate sheet disposed on a support so as to be fixed and a first driving piece configured to move the stripper in an upward-downward direction, and a control member configured to, when the punch presses the laminate sheet while being inserted in a shaping portion of the support, control the first driving piece such that the stripper is moved upwards, thereby reducing pressing force applied to the laminate sheet. In Patent Document 1, the control member, which controls the stripper driving piece configured to move the stripper upwards when the punch is moved downwards to press the laminate sheet, is added, whereby the structure of the pouch shaping apparatus is complicated.

Patent Document 2 discloses a pouch shaping apparatus that uniformly disperses stretching force applied to a pouch film when a cup part of a pouch is formed, thereby preventing generation of wrinkles at the cup part. In Patent Document 2, a blanking holder is located at a central part of the support so as to be movable upwards and downwards, the blanking holder contacts one surface of the laminate sheet disposed at an upper end of the support, and the blanking holder is moved downwards together with the punch that is moved downwards from an upper end of the laminate sheet after contact with the laminate sheet disposed at the upper end of the support, whereby the cup part is formed.

In Patent Documents 1 and 2, formation of wrinkles at a corner part of a pouch case is prevented; however, the construction of the apparatus is more complicated than conventional pouch shaping apparatuses, and a pouch shaping process is complicated.

PRIOR ART DOCUMENTS (Patent Document 1) Korean Registered Patent Publication No. 2145494

(Patent Document 2) Korean Registered Patent Publication No. 2176631

BRIEF SUMMARY OF THE INVENTION

The present invention has been made in view of the above problems, and it is an object of the present invention to provide a pouch shaping apparatus capable of, when pressing a laminate sheet to form a receiving portion configured to receive an electrode assembly, reducing or preventing generation of wrinkles at a corner of the receiving portion and a pouch with remedied wrinkles manufactured thereby.

A pouch shaping apparatus according to the present invention to accomplish the above object includes a support unit configured to allow a laminate sheet to be disposed on an upper surface thereof, a stripper located above the support unit, the stripper being configured to be movable upwards and downwards, the stripper being configured to press and fix an outer periphery of the laminate sheet disposed on the upper surface of the support unit when being moved downwards, and a punch located above the support unit, the punch being configured to be movable upwards and downwards, the punch being configured to form an electrode assembly receiving portion in the laminate sheet while being inserted into a shaping portion located at the center of the support unit when being moved downwards, wherein the support unit includes an upper support and a support plate, and the pouch shaping apparatus includes a core member located between the upper support and the support plate, the core member having a predetermined thickness.

The upper support may include a shaping portion, as an empty space defined therein, the shaping portion being configured to allow the punch to be inserted thereinto such that the electrode assembly receiving portion is formed in the laminate sheet, and an upper support frame constituting a periphery of the shaping portion.

The core member may be provided in plural, the plural core members being disposed spaced apart from each other.

The core members may be disposed at a lower end of the upper support frame adjacent to corner parts of the shaping portion.

The core members may be disposed at positions symmetrical with respect to the center of the upper support frame.

The core member may be provided on at least one surface thereof with an adhesive layer, and the core member may be detachably attached to an upper surface of the support plate and/or a lower surface of the upper support frame.

A pressing surface of the stripper that faces the laminate sheet may face an upper surface of the upper support frame, and the stripper may include a second stripper added to the pressing surface and a first stripper disposed at a lower surface of the second stripper.

The second stripper may include an elastic material.

Bead portions may be disposed so as to correspond to each other at a pressing surface of the stripper that faces an upper surface of the laminate sheet and an upper surface of the upper support frame that faces a lower surface of the laminate sheet.

The bead portions may be provided in plural, the plural bead portions being disposed spaced apart from each other.

The bead portions may be disposed at positions adjacent to corner parts of the shaping portion.

Each of the bead portions may be formed in a straight shape and may be located so as to have an oblique angle with respect to two sides that join each other at a right angle of the upper support frame constituting the shaping portion.

In addition, the present invention provides a pouch manufactured using the pouch shaping apparatus and a pouch-shaped battery comprising the pouch.

In addition, the present invention may provide various combinations of the above solving means.

As is apparent from the above description, a pouch shaping apparatus according to the present invention has an effect in that a core member is added, whereby it is possible to reduce or prevent generation of wrinkles at a corner part of a pouch receiving portion while minimizing an increase in construction and volume.

In addition, the pouch shaping apparatus according to the present invention has an advantage in that it is possible to easily replace an upper support based on the size of a battery.

BRIEF DESCRIPTION OF THE DRAWINGS

FIG. 1 is a schematic view of a pouch-shaped battery.

FIG. 2 is a photograph showing wrinkles formed at a corner part of a receiving portion of the pouch-shaped battery.

FIG. 3 is a front view of a pouch shaping apparatus according to a first embodiment of the present invention.

FIG. 4 is a perspective view of a support unit of the pouch shaping apparatus according to the first embodiment of the present invention.

FIG. 5 is an exploded perspective view of FIG. 4.

FIG. 6 is a perspective view of a stripper according to a second embodiment of the present invention.

FIG. 7 is a perspective view of a stripper according to a third embodiment of the present invention.

FIG. 8 is a perspective view of a support unit according to a third embodiment of the present invention.

FIGS. 9A and 9B show the results of simulation according to Example 1 and Example 2 of the present invention.

FIGS. 10A and 10B show the results of simulation according to Example 3 of the present invention.

FIGS. 11A and 11B show the results of simulation according to Comparative Example 1 of the present invention.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

FIG. 3 is a front view of a pouch shaping apparatus according to a first embodiment of the present invention, FIG. 4 is a perspective view of a support unit of the pouch shaping apparatus according to the first embodiment of the present invention, and FIG. 5 is an exploded perspective view of FIG. 4.

Referring to FIGS. 3 to 5, the pouch shaping apparatus 100 according to the first embodiment of the present invention includes a support unit 400 configured to allow a laminate sheet 500 to be disposed on an upper surface thereof, a stripper 300 located above the support unit 400, the stripper being configured to be movable upwards and downwards, the stripper being configured to press and fix an outer periphery of the laminate sheet 500 disposed on the upper surface of the support unit 400 when being moved downwards, and a punch 200 located above the support unit 400, the punch being configured to be movable upwards and downwards, the punch being configured to form an electrode assembly receiving portion in the laminate sheet 500 while being inserted into a shaping portion 412 located at the center of the support unit 400 when being moved downwards. Although not shown in the drawings, the pouch shaping apparatus 100 may include a controller and a driving unit configured to move the punch 200 and the stripper 300 upwards and downwards.

The punch 200 according to the first embodiment of the present invention is located above the support unit 400, is configured to be movable upwards and downwards, and forms the electrode assembly receiving portion in the laminate sheet 500 while being inserted into the shaping portion 412 located at the center of the support unit 400 when being moved downwards. Although not shown in the drawings, a punch controller and a punch driving unit configured to move the punch 200 upwards and downwards may be included. When the punch driving unit is driven, the punch 200 presses the laminate sheet 500 located at an upper end of the support unit 400 so as to be inserted into the shaping portion 412 while being moved downwards, whereby the electrode assembly receiving portion is formed in the laminate sheet 500.

The stripper 300 according to the first embodiment of the present invention, which is provided to fix the laminate sheet 500 disposed on the uppermost surface of the support unit 400, is located above the support unit 400, and is configured to be movable upwards and downwards. Although not shown in the drawings, a stripper controller and a stripper driving unit configured to move the stripper 300 upwards and downwards may be included. The stripper 300 has a size corresponding to the size of an upper surface of an upper support 410, and a hole (not shown), through which the punch 200 can extend, is formed in a central part of the stripper.

The support unit 400 includes an upper support 410 and a support plate 420. Here, the area of the upper support 410 may be equal to or less than the area of the support plate 420 such that an outer periphery of the upper support 410 does not extend farther than an outer periphery of the support plate 420.

The upper support 410 includes a shaping portion 412, which is an empty space defined therein, the shaping portion being configured to allow the punch 200 to be inserted thereinto such that the electrode assembly receiving portion is formed in the laminate sheet 500, and an upper support frame 411 constituting a periphery of the shaping portion 412.

The shaping portion 412 is located in the upper support frame 411, and is formed through the upper support 410 from an upper surface to a lower surface thereof in order to form the electrode assembly receiving portion. The shaping portion 412 is configured to have a size corresponding to the size of the hole of the stripper 300, and the punch 200 may be inserted up into the shaping portion 412 through the hole of the stripper 300.

The support plate 420 is located at a lower surface of the upper support frame 411.

A plurality of core members 430 is disposed so as to be spaced apart from each other between facing surfaces of the support plate 420 and the upper support frame 411. Specifically, four core members 430 are located at parts adjacent to four corner parts B of the shaping portion 412 in one-to-one correspondence.

The core members 430 are located between the upper support 410 and the support plate 420, and it may be seen that the core members are disposed at a lower end of the upper support frame 411 adjacent to the corner parts B of the shaping portion 412.

Each of the core members 430 may be formed in an "L" shape corresponding to two sides that join each other at a right angle of the upper support frame 411 that forms the corner parts B of the shaping portion 412. That is, each core member may be constituted by one long side and one short side that are coupled perpendicular to each other so as to form an "L" shape.

The core members 430 are disposed at positions symmetrical with respect to the center of the upper support frame 411. That is, the "L"-shaped core members may be disposed at the lower end of the upper support frame adjacent to the corner parts B in symmetry. Diagonal symmetry, horizontal symmetry, and vertical symmetry are possible as symmetry. Although each core member 430 is shown as having an "L" shape in the drawings, each core member may be configured to have an "I" shape.

Since each core member 430 has a predetermined thickness, the upper support 410 and the support plate 420 are spaced apart from each other by the core members 430.

When the punch 200 is moved downwards to press the laminate sheet 500 located on the support unit 400 so as to be inserted into the shaping portion 412, the upper support frame 411 cannot move downwards in a z-axis direction due to the core members 430 at the corner parts B of the shaping portion at which the core members 430 are located, but the upper support frame 411 is deformed in the z-axis direction with increasing distance from the core members 430, whereby the downward movement distance of the upper support frame is increased.

Since the movement distance of the upper support frame 411 at a middle part of each of sides thereof in an overall length direction is greater than the movement distance of the upper support frame at each of the corner parts, the z-axis downward movement distance of the upper support frame 411 is the maximum at the middle part of each of the sides thereof in the overall length direction. The laminate sheet 500 interposed between the punch 200 and the upper support frame 411 is minimally stretched at the middle part of each of the sides of the upper support frame 411 in the overall length direction. As a result, when the laminate sheet is pressed by the punch, tensile force is generated at the central part of the laminate sheet in the overall length direction, which is the minimally stretched portion, toward the corner parts B.

When the laminate sheet is pressed by the punch to shape a pouch, at corner parts of a receiving portion of the pouch, radial tensile force acting in a depth direction of the receiving portion and circumferential compressive force concentrated from sealed surfaces of the corner parts to the corner parts are generated. As shown in FIG. 2, wrinkles are generated at each of the corner parts of the pouch by the radial tensile force and the circumferential compressive force.

When the core members 430 are disposed between the upper support 410 and the support plate 420, as in the present invention, additional tensile force is generated at each of the corner parts of the laminate sheet, when the laminate sheet is pressed by the punch, whereby the radial tensile force concentrated on the corner parts B of the shaping portion 412 is reduced, and therefore, it is possible to reduce generation of wrinkles at the corner parts of the receiving portion.

The core members 430 may have uniform thickness. The thickness of each of the core members 430 may range from 20 µm to 50 µm, specifically from 20 µm to 30 µm. If the thickness of each of the core members 430 is less than 20 µm, when the laminate sheet 500 is pressed by the punch 200, whereby the laminate sheet is inserted into the shaping portion 412 to form the electrode assembly receiving portion, it is difficult to prevent generation of wrinkles at the corner parts of the electrode assembly receiving portion, since the downward movement distance of the upper support frame 411 in the z-axis direction is too short. If the thickness of each of the core members is greater than 50 µm, the laminate sheet 500 may be excessively stretched at the center of the shaping portion 412 in the downward direction (z-axis direction), whereby the laminate sheet may rupture.

The thickness of each core member 430 may be changed based on the following criterion in consideration of the thickness of the laminate sheet.

When the long side and the short side of each core member 430 join each other at a right angle so as to be formed in an "L" shape, the thickness of the core member may range from 20 µm to 30 µm, the length of the long side of each core member may range 50 mm to 70 mm, and the length of each short side of the core member may range 30 mm to 50 mm. In addition, each core member 430 may be formed in an "I" shape having a thickness of 20 µm to 30 µm and a length of 30 mm to 70 mm. If the lengths of each core member are less than the minimum value of the length, it is difficult to prevent formation of wrinkles at the corner parts of the receiving portion when the laminate sheet 500 is shaped. If the lengths of each core member are greater than the maximum value of the length, cracks may be generated when the receiving portion is formed.

In the present invention, each core member 430 may be made of the same material as the upper support 410 and the support plate 420. In addition, each core member 430 may be made of a material that exhibits high rigidity and elasticity. This is advantageous to preventing breakage of each core member 430 due to pressure repeatedly applied thereto when the stripper 300 is moved downwards to press and fix the laminate sheet 500 located at the upper end of the upper support 410 or absorbing stress applied to the upper support 410 and the support plate 420 located above and under the core members to prevent damage to the upper support 410 and the support plate 420.

In the present invention, at least one of an upper surface of each core member 430 that faces the upper support 410 and a lower surface of each core member 430 that faces the support plate 420 may include an adhesive layer (not shown). For example, each core member 430 may be detachably attached to an upper surface of the support plate 420 and/or a lower surface of the upper support frame 411. When the upper support 410 is changed so as to correspond to various sizes of pouch-shaped battery cases, the position of each core member 430 on the upper surface of the support plate 420 may be changed based on the size of the upper support 410, and each core member 430 may be fixed using the adhesive layer.

In another example, a recess, into which a part of each core member 430 is inserted, may be provided in each of the lower surface of the upper support frame 411 and the upper surface of the support plate 420 such that the upper support frame 411 and the support plate 420 are not moved when the laminate sheet 500 is shaped.

The upper support 410 and the support plate 420 may be coupled and fixed to each other via a coupling member configured to be easily detached and attached.

FIG. 6 is a perspective view of a two-stage stripper according to a second embodiment of the present invention.

Referring to FIG. 6, a two-stage stripper 1300 of a pouch shaping apparatus according to a second embodiment includes a first stripper 1310 and a second stripper 1320, wherein the first stripper corresponds to the stripper of the pouch shaping apparatus according to the first embodiment, and it is understood that the pouch shaping apparatus according to the second embodiment is configured to have a structure in which the second stripper is added to the pouch shaping apparatus according to the first embodiment. Hereinafter, therefore, only the two-stage stripper 1300 will be described. A description of the stripper of the pouch shaping apparatus according to the first embodiment may be equally applied to the first stripper, and therefore only the two-stage stripper will be described hereinafter.

The two-stage stripper 1300 according to the second embodiment includes a first stripper 1310 and a second stripper 1320. As shown in FIG. 6, the second stripper 1320 is located spaced apart from a hole of the first stripper 1310 by a predetermined distance.

The second stripper 1320 is added to a pressing surface of the stripper that faces the laminate sheet. Specifically, the second stripper 1320 faces the upper support 410 while being located at a lower surface of the first stripper 1310. Here, the second stripper 1320 may have predetermined adhesiveness and/or may include an elastic material. Alternatively, the second stripper may be constituted by a coating layer including an elastic material. Consequently, the second stripper 1320 may increase fixing force of the laminate sheet located at the upper end of the support unit and may control the pouch inflow amount at the corner parts of the electrode assembly receiving portion formed in the receiving portion of the support unit by insertion due to downward movement of the punch, whereby it is possible to reduce generation of wrinkles.

FIG. 7 is a perspective view of a stripper according to a third embodiment of the present invention, and FIG. 8 is a perspective view of a support unit according to a third embodiment of the present invention.

Referring to FIGS. 7 and 8, a pouch shaping apparatus according to a third embodiment of the present invention includes a stripper 2300 and a support unit 2400, wherein the support unit 2400 includes an upper support 2410 and a support plate 2420. The pouch shaping apparatus according to the third embodiment is identical to the pouch shaping apparatus described with reference to FIGS. 3 to 5 except that corresponding bead portions are located at facing surfaces of the stripper and the support unit. Hereinafter, therefore, only the bead portions formed at the stripper and the support unit will be described.

The pouch shaping apparatus according to the third embodiment includes bead portions formed at the stripper and the support unit. Specifically, bead portions are disposed so as to correspond to each other at a pressing surface of the stripper 2300 that faces the upper surface of the laminate sheet and an upper surface of an upper support frame 2411 that faces the lower surface of the laminate sheet.

The bead portions include a first bead portion 610 located at the stripper 2300 and a second bead portion 620 located at the support unit 2400.

A plurality of first bead portions 610 is disposed so as to be spaced apart from each other, and a plurality of second bead portions 620 is disposed so as to be spaced apart from each other. Four first bead portions 610 are disposed at a lower surface of the stripper 2300 so as to be adjacent respectively to four corner parts thereof, and the second bead portions 620 are disposed at an upper surface of the upper support 2410 so as to be adjacent respectively to four corner parts thereof.

Here, each second bead portion 620 may be an "I"-shaped slit that is located at an upper surface of the upper support frame 2411 of the upper support 2410, that is formed in a straight shape having a predetermined length, and that has a concave recess. The "I"-shaped second bead portions 620 are located adjacent respectively to four corner parts of a shaping portion 2412 of the upper support 2410, and are located so as to have an oblique angle with respect to two sides that join each other at a right angle of the upper support frame 2411 constituting the shaping portion 2412.

The first bead portions 610 are located at the lower surface of the stripper 2300 that faces the support unit 2400. Each of the first bead portions 610 is configured in a convex shape corresponding to a corresponding one of the second bead portions 620, each of which is a concave recess, so as to be inserted into a corresponding one of the second bead portions 620. Here, the first bead portions 610 are disposed at positions corresponding to the second bead portions 620.

Although the first bead portions 610 are convex and the second bead portions 620 are concave in the above description, the convex shapes and the concave shapes may be disposed so as to cross each other as long as the first bead portions and the second bead portions are capable of fixing the laminate sheet therebetween.

Example 1

Four "L"-shaped core members were disposed between an upper support and a support plate so as to be adjacent to corner parts of a shaping portion of the upper support. The thickness of each core member was 20 μm, the length of a long side of each core member was 50 mm, and the length of a short side of each core member was 30 mm. Shaping of a laminate sheet was simulated using a pouch shaping apparatus including the core members, and the maximum displacement of the shaping portion in a direction toward a lower part of a pouch (z-axis direction) was checked.

Example 2

Shaping of a laminate sheet was simulated in the same manner as in Example 1 except that core members each having a thickness of 30 μm were used, and the maximum displacement of a shaping portion in a direction toward a lower part of a pouch (z-axis direction) was checked.

FIGS. 9A-9B show the results of simulation according to Example 1 and Example 2 of the present invention. In FIGS. 9A-9B, only 50% of the support plate cut at a middle part thereof in an overall length direction is shown.

Referring to FIG. 9A, the figure on the left side of FIG. 9A shows the maximum displacement of Example 1 in the Z-axis direction, and the figure on the right side of FIG. 9B shows the maximum displacement of Example 2 in the Z-axis direction.

For Example 1, in which the thickness of each core member was 20 μm, the maximum displacement of the laminate sheet in the shaping portion was 34 μm. For Example 2, in which the thickness of each core member was 30 μm, the maximum displacement of the laminate sheet in the shaping portion was 51 μm. It can be seen therefrom that the displacement of the stretched laminate sheet was increased in proportion to the thickness of each core member.

Example 3

A laminate sheet was shaped using a pouch shaping apparatus including a two-stage stripper constituted by a first stripper and a second stripper, and the thickness increase rate of the laminate sheet at each corner part of a receiving portion was checked. The increased thickness of the laminate sheet was caused by wrinkles formed at each corner part, which means that the smaller the thickness increase rate, the less wrinkles are generated.

Comparative Example 1

The thickness increase rate of a laminate sheet was checked using the same method as in Example 3 except that a stripper including no second stripper was used, unlike the two-stage stripper of Example 3.

FIGS. 10A and 10B show the results of simulation according to Example 3 of the present invention, and FIGS. 11A and 11B show the results of simulation according to Comparative Example 1 of the present invention.

Referring to FIGS. 10A-10B and 11A-11B, when a conventional stripper including no second stripper was used, as in Comparative Example 1, the thickness of each corner part of a receiving portion was increased by 2.24%. When a two-stage stripper including a second stripper was used, as in Example 3, the thickness of each corner part of the receiving portion was increased by 1.08%. Consequently, it can be seen that, when the two-stage stripper was used, wrinkles generated at each corner part were reduced.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE SYMBOLS

10: Pouch-shaped battery
20: Battery case
21: Upper case
22: Lower case
23: Receiving portion
30: Electrode assembly
100: Pouch shaping apparatus
200: Punch
300, 2300: Strippers
1300: Two-stage stripper
1310: First stripper
1320: Second stripper
400, 2400: Support units
410, 2410: Upper supports
411, 2411: Upper support frames
412, 2412: Shaping portions
420, 2420: Support plates
430: Core member
500: Laminate sheet
610: First bead portion
620: Second bead portion
A: Corner part of electrode assembly receiving portion
B: Corner part

The invention claimed is:

1. A pouch shaping apparatus comprising:
   a support unit configured to allow a laminate sheet to be disposed on an upper surface thereof;
   a stripper located above the support unit, the stripper configured to be movable upwards and downwards, the stripper also configured to press and fix an outer periphery of the laminate sheet disposed on the upper surface of the support unit when moved downwards; and
   a punch located above the support unit, the punch configured to be movable upwards and downwards in a first direction, the punch also configured to form an electrode assembly receiving portion in the laminate sheet while inserted into a shaping portion located at a center of the support unit when moved downwards, wherein
   the support unit comprises an upper support and a support plate, and
   the pouch shaping apparatus comprises a core member located between the upper support and the support plate, the core member having a predetermined thickness and configured to support the upper support while spacing the upper support and the support plate apart from each other to create a gap along the first direction between the upper support and the support plate such that the upper support does not move along the first direction but deforms along the first direction away from the core member.

2. The pouch shaping apparatus according to claim 1, wherein the upper support comprises:
   a shaping portion, as an empty space defined therein, the shaping portion configured to allow the punch to be inserted thereinto such that the electrode assembly receiving portion is formed in the laminate sheet; and
   an upper support frame constituting a periphery of the shaping portion.

3. The pouch shaping apparatus according to claim 2, wherein the core member comprises a plurality of core members, the plurality of core members disposed spaced apart from each other.

4. The pouch shaping apparatus according to claim 3, wherein the core members are disposed at a lower end of the upper support frame adjacent to corner parts of the shaping portion.

5. The pouch shaping apparatus according to claim 4, wherein the core members are disposed at positions symmetrical with respect to a center of the upper support frame.

6. The pouch shaping apparatus according to claim 3, wherein
   the core member comprises, on at least one surface thereof, an adhesive layer, and
   the core member is detachably attached to an upper surface of the support plate and/or a lower surface of the upper support frame.

7. The pouch shaping apparatus according to claim 2, wherein
   a pressing surface of the stripper that faces the laminate sheet faces an upper surface of the upper support frame, and
   the stripper comprises a first stripper, and a second stripper provided on the pressing surface and disposed at a lower surface of the first stripper.

8. The pouch shaping apparatus according to claim 7, wherein the second stripper comprises an elastic material.

9. The pouch shaping apparatus according to claim 2, further comprising bead portions disposed so as to correspond to each other at a pressing surface of the stripper that faces an upper surface of the laminate sheet and an upper surface of the upper support frame that faces a lower surface of the laminate sheet.

10. The pouch shaping apparatus according to claim 9, wherein the bead portions are disposed spaced apart from each other.

11. The pouch shaping apparatus according to claim 9, wherein the bead portions are disposed at positions adjacent to corner parts of the shaping portion.

12. The pouch shaping apparatus according to claim 11, wherein each of the bead portions is formed in a straight shape and is located so as to have an oblique angle with respect to two sides that join each other at a right angle of the upper support frame constituting the shaping portion.

13. The pouch shaping apparatus according to claim 2, wherein the core member is located adjacent to a corner of the shaping portion.

14. The pouch shaping apparatus according to claim 2, wherein the core member comprises four core members, and
   wherein each of the four core members is located adjacent to one of four corners of the shaping portion.

15. The pouch shaping apparatus according to claim 14, wherein the four core members are configured to create a plurality of gaps, each gap extending between each pair of the four core members and the upper support and the support plate along a second direction perpendicular to the first direction.

16. A pouch shaping apparatus comprising:
   a support unit configured to allow a laminate sheet to be disposed on an upper surface thereof;
   a stripper located above the support unit, the stripper configured to be movable upwards and downwards, the stripper also configured to press and fix an outer periphery of the laminate sheet disposed on the upper surface of the support unit when moved downwards; and
   a punch located above the support unit, the punch configured to be movable upwards and downwards, the punch also configured to form an electrode assembly receiving portion in the laminate sheet while inserted into a shaping portion located at a center of the support unit when moved downwards, wherein
   the support unit comprises an upper support and a support plate, and
   the pouch shaping apparatus comprises at least two core members located between the upper support and the support plate, each of the at least two core members having a predetermined thickness and spaced apart from one another to permit a deformation of a section, between the at least two core members, of the upper support, the deformation being relative to the support plate.

17. The pouch shaping apparatus according to claim 16, wherein each of the at least two core members are positioned adjacent to one of four corners of the shaping portion.

18. The pouch shaping apparatus according to claim 17, wherein the at least two core members comprise four core members, each of the four core members positioned adjacent to one of the four corners of the shaping portion.

* * * * *